Figure 1:
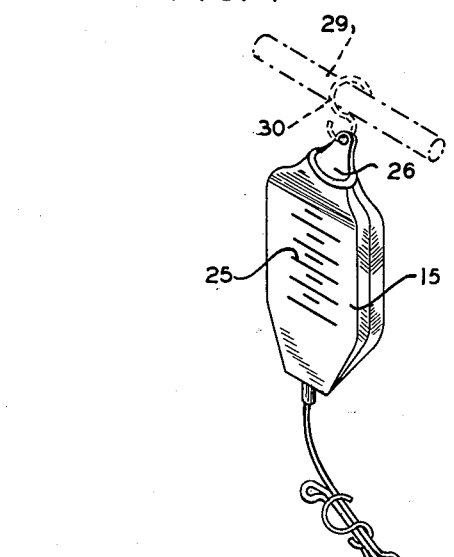

Feb. 26, 1963 A. H. MILBERT 3,078,848
MEDICAL APPLICATOR
Filed April 25, 1960

INVENTOR.
A. H. MILBERT
BY
ATTORNEY

United States Patent Office 3,078,848
Patented Feb. 26, 1963

3,078,848
MEDICAL APPLICATOR
Arthur H. Milbert, 2 Hudson St., Yonkers, N.Y.
Filed Apr. 25, 1960, Ser. No. 24,585
1 Claim. (Cl. 128—251)

This invention relates to a medical applicator especially designed for feminine use incorporating novel features improving and facilitating use and application thereof in a convenient and effective manner.

Figure 2:
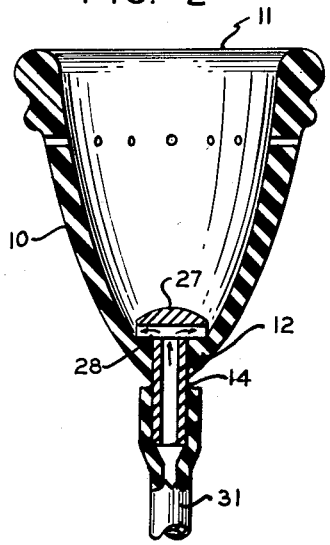
Figure 3:
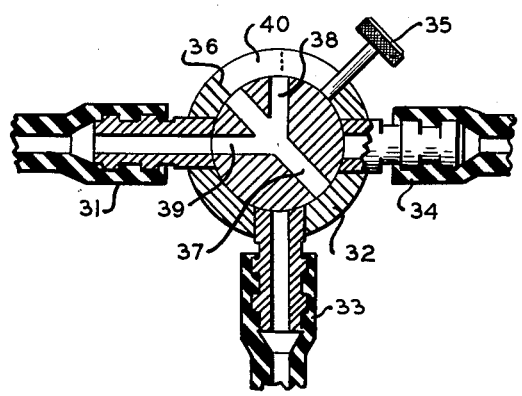
Figure 4:
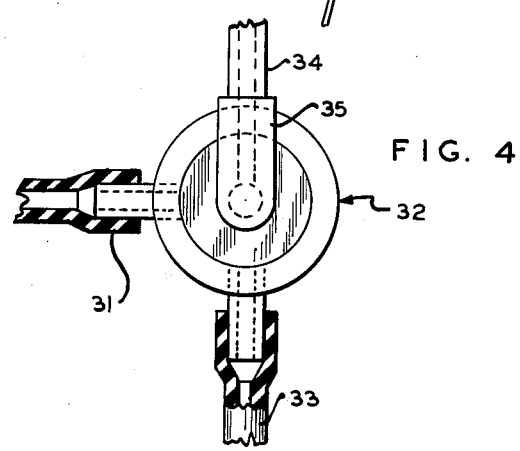

The foregoing and other objects will become apparent from a consideration of the invention as described below and in the accompanying drawings forming a part hereof wherein similar reference characters indicate similar parts and wherein:

FIG. 1 is a fragmentary, perspective view of a form of the invention adapted for douching purposes, FIG. 2 is a fragmentary, sectional view of a flexible cup member, and tube connected thereto, especially adapted for use in connection with the FIG. 1 form of the invention, FIGS. 3 and 4 are fragmentary sectional views of forms of valve 32 which may be used in connection with the FIG. 1 form of the invention.

The drawings, illustrating devices useful in carrying out the invention, and the description below, are exemplary only of the invention, which shall be deemed to cover all other devices coming within the scope and purview of the appended claims.

Pursuant to the invention, a cup shaped, flexible member 10 is provided for insertion within the vaginal orifice, for fluid exchange, having a large open end 11 for the passage of fluids and a constricted end 12 with an aperture 13 therethrough for reception of an axially apertured fitting 14. The fitting 14 is positioned in the constricted end of the cup-shaped member and projects thereinto and therefrom for relative flow of liquids between the cup and fitting.

In the FIG. 1 form, the bag 15 is open at the top thereof for filling with the douching, irrigating or other therapeutic fluid and may be transparent or translucent, with said markings 25 thereon to note the fluid level. The fitting 14 of FIG. 2 may be provided with an enlarged head 27 to be positioned within the constricted end 12 of cup-shaped member 10, said enlarged head portion being provided with a plurality of fluid discharge slots or other slotted portion 28 (FIG. 2) communicating with the axial aperture in said fitting so that when liquid flows through the fitting and into the cup shaped flexible member 10, a lateral rather than direct spray effect will be attained, so as to avoid having a forceful current of fluid directed at the cervix and cervical canal and avoid possible forceful entry of material into the uterus or fallopian tubes. The bag 15, in the FIG. 1 form of the invention, may be suspended from a suitable support 29 by a bracket 30. A first flexible tube 31 connects the fitting 14 and thereby the cup-shaped flexible member 10 with the valve 32; said valve has a drainage tube 33 extending therefrom and a second flexible tube 34 connects the bag 15 with the valve 32 (FIGS. 3 and 4) for selective connection of the first and second tubes 31, 34 with said valve. Thus selective connection of the first and second tubes 31, 34 or first and third tubes 31, 33, may be attained through said valve. The valve (which may be made of suitable plastic or other material) may have a control knob or shaft 35 movable in slot 40 in the valve shown in FIG. 3; the full line position is the "off" position at which the tubes 31, 33, 34 are not connected with each other. On rotation of the control 35 counterclockwise to the center (dotted line) portion of slot 40 of the valve, the cross aperture 37 in the valve will register with and connect the first and second flexible tubes 31 and 34. On rotation of the control 35 to the left end position 36, apertures 38 and 39 will register with and connect tubes 31 and 33. In FIG. 4 a further valve is shown wherein the second flexible tube 34 is connected to apertures such as 37, 38, 39 of the valve through the control member 35, on rotation of which connection and disconnection of the flexible tubes as above described in connection with the FIG. 3 form may be attained.

Fluid from the bag 15 may be passed internally of the body through the tubes 34 and 31, ironing out all folds and reaching all crevices for cleansing or application of medicated solutions. In the closed or stop position of the valve (FIG. 3) fluid may be retained in the body cavity for as long a period as desired; in the valve position of connection of tubes 31 and 33 the fluid may be readily evacuated.

Having thus described my invention, what I claim as new and desire to secure by Letters Patent is:

A medical applicator comprising a cup shaped member of highly flexible material to facilitate flexing thereof on manipulation for vaginal application, said member having a large open end for passage of fluids and a constricted opposite end, axially aligned with the center of the open end, an axially apertured substantially inflexible fitting positioned in the constricted end of the cup shaped member substantially projecting therefrom, for relative flow of fluids between the cup and fitting, a bag for containing fluids, a valve, a first flexible tube connecting said fitting with said valve and a second flexible tube connecting said bag with said valve and a drainage tube extending from said valve, means in said valve for selective connection of the first and second flexible tubes in the flow of fluids from the bag into the cup shaped flexible member, said axially apertured fitting having a head portion overlying the axially apertured portion thereof, said head portion being adapted to be positioned within the constricted end of the cup shaped member, said head portion being provided with a slotted portion communicating with the axial aperture in said fitting.

References Cited in the file of this patent

UNITED STATES PATENTS

| | | |
|---|---|---|
| 300,770 | Farr | June 24, 1884 |
| 1,178,644 | Johnson | Apr. 11, 1916 |
| 1,853,202 | Catlin | Apr. 12, 1932 |
| 2,023,026 | Miller | Dec. 3, 1935 |
| 2,328,569 | McGaw | Sept. 7, 1943 |
| 2,379,346 | Farrell | June 26, 1945 |
| 2,669,233 | Friend | Feb. 16, 1954 |
| 2,839,052 | Verch et al. | June 17, 1958 |
| 2,855,932 | Stubbs | Oct. 14, 1958 |

FOREIGN PATENTS

| | | |
|---|---|---|
| 256,702 | Switzerland | Mar. 1, 1949 |